United States Patent
Bar et al.

(10) Patent No.: US 10,496,435 B2
(45) Date of Patent: Dec. 3, 2019

(54) SYSTEM AND METHOD FOR PARTITIONING AND MANAGING TIMERS IN A VIRTUALIZED SYSTEM

(71) Applicant: NXP USA, INC., Austin, TX (US)

(72) Inventors: Ron Michael Bar, Ramat Hasharon (IL); Eran Glickman, Rishon le Zion (IL); Hezi Rahamim, Ramat Gan (IL)

(73) Assignee: NXP USA, INC., Austin, TX (US)

( * ) Notice: Subject to any disclaimer, the term of this patent is extended or adjusted under 35 U.S.C. 154(b) by 352 days.

(21) Appl. No.: 15/373,208

(22) Filed: Dec. 8, 2016

(65) Prior Publication Data

US 2018/0165118 A1 Jun. 14, 2018

(51) Int. Cl.
G06F 9/48 (2006.01)

(52) U.S. Cl.
CPC .................... *G06F 9/4825* (2013.01)

(58) Field of Classification Search
CPC .... G06F 3/0604; G06F 3/0631; G06F 3/0673; G06F 9/4825
See application file for complete search history.

(56) References Cited

U.S. PATENT DOCUMENTS

| 5,894,583 A | 4/1999 | Johnson et al. | |
|---|---|---|---|
| 5,983,143 A * | 11/1999 | De Wille | F16H 61/0213 701/1 |
| 7,472,237 B1 * | 12/2008 | Herbst | G06F 9/5027 711/152 |
| 7,941,688 B2 * | 5/2011 | Sharma | G06F 9/45533 713/502 |
| 8,046,731 B2 * | 10/2011 | Sabev | G06F 9/4825 709/212 |
| 2003/0101440 A1 * | 5/2003 | Hardin | G06F 9/4812 717/148 |
| 2008/0075267 A1 * | 3/2008 | Srinivasachar | H04L 12/66 379/265.01 |

(Continued)

FOREIGN PATENT DOCUMENTS

| CN | 101505238 A | 8/2009 |
|---|---|---|
| CN | 102801586 A | 11/2012 |

OTHER PUBLICATIONS

U.S. Appl. No. 15/395236, filed Dec. 30, 2016, entitled "System and Method for Autonomous Time-Based Debugging".

(Continued)

*Primary Examiner* — Meng Ai T An
*Assistant Examiner* — Willy W Huaracha

(57) ABSTRACT

A processing system includes a data processor, an input, an output, a memory, an operation parser, and a timer manager instance controller. The input receives create-timer-manager-instance (CTMI) commands identifying a number of timers supported by a timer manager instance. The output provides responses including a CTMI response associated with the CTMI command. The operation parser receives the CTMI command from the input. The timer manager instance controller receive a control input from the operation parser based upon the CTMI command, and in response, allocates a block of memory locations in the memory based on the number of timers and provides a CTMI response to the output to indicate that the CTMI response was executed by the timer manager instance controller.

19 Claims, 5 Drawing Sheets

(56) References Cited

U.S. PATENT DOCUMENTS

2008/0244302 A1* 10/2008 Khatri ..................... G06F 1/14
                                                    713/502
2015/0234419 A1*  8/2015 Bar ......................... G06F 1/14
                                                    713/502
2016/0179716 A1*  6/2016 An .......................... G06F 13/24
                                                    710/262

OTHER PUBLICATIONS

Notice of Allowance dated Oct. 16, 2018 in U.S. Appl. No. 15/395,236.
Non-final office action dated Apr. 6, 2018 in U.S. Appl. No. 15/395,236.

* cited by examiner

SYSTEM AND METHOD FOR PARTITIONING AND MANAGING TIMERS IN A VIRTUALIZED SYSTEM

FIELD OF THE DISCLOSURE

This disclosure generally relates to timers, and more particularly relates to a time manager for managing timers in a processing system.

BACKGROUND

Timers are used in a wide variety of situations in data processing systems. For example, timers can be utilized to provide accurate time measurement for one-time events or for recurring events. One-time event timers provide a single time out for a particular purpose. For example, a one-time event timer can be initiated when a user is prompted by an application to provide an input to a processing system. If the input has not been received before the timer times out, a default input can be provided in place of the user supplied input, or another event can be initiated. A sequence of timers for a common event, where each timer is similar to a one-time event timer, can constitute what is referred to as a watchdog timer. During normal operation, a watchdog timer is not expected to time out. Instead, a watchdog timer is expected to be periodically reset by the processing system, before timing out, each time an expected event occurs. Thus, the expected recurring event is monitored to make sure it occurs, and if there is a problem with the recurring event the watchdog timer will expire, and provide a time out indication to notify the processing system. A periodic series of event timers can be used in association with periodically recurring events of the processing system, such as a time base that is used to update the illustrated time of a computer monitor every second.

The number of timers used by applications being handled by a data processor can be much larger than the number of hardware timers implemented at the data processor. For example, in the context of digital networking, timers can be used to manage thousands or millions of parallel network traffic flows. As such, processing systems often include timer software that interfaces with one or more of the hardware timers to implement a linked list of timer, also referred to as software timers, where each timer is represented by an entry in the linked list that is linked to other timer entries in a time-ranked order, e.g., from the soonest to expire timer to the last to expire timer. The creation of a new timer involves determining a system expiration time for the new timer, traversing the linked list to find where the new timer is to be placed in the linked list, and then inserting the new timer into the linked list. By having software comparing the top entry, e.g., the next timer to expire, to a counter, or by loading the next to expire timer into a hardware timer, a large number of timers can effectively be implemented. In this way, a larger number of timers can be implemented than the available number of hardware counters. However, in certain applications, such as large scale virtualization applications, timer software can be tasked with implementing and managing tens of millions of timers, and such a large linked list can require a significant amount of processing system. Moreover, the strict partitioning of resources in a highly virtualized processing system may necessitate that the timer software manages the partitioning of the timers for each different virtual environment, which further increases the demand for processing resources that are dedicated to timer management. Therefore there remains a need for more efficient timer management in a processing system.

BRIEF DESCRIPTION OF THE DRAWINGS

Embodiments incorporating teachings of the present disclosure are shown and described with respect to the drawings presented herein, in which.

Elements in the figures are illustrated for simplicity and clarity and have not necessarily been drawn to scale. In the figures, elements which correspond to elements already described may have the same reference numerals.

DETAILED DESCRIPTION OF DRAWINGS

In an embodiment of the present disclosure, a co-processor of a processing system includes a timer manger controller that manages the creation, maintenance, and deletion of timer managers, called timer manager instances (TMIs), each of which can implement a plurality of timers identified in a corresponding linked list. For example, a particular TMI can be created to support a particular application, such as a virtualized machine environment (VM), a task that may be associated with a particular VM, a group of tasks that may be associated with a particular VM, and the like. By providing a dedicated timer manager controller that implements TMIs, the processing system does not need to implement timer manager software that would use bandwidth of a general purpose instruction based processor. Thus, the general purpose processing resources of the processing system are available for other applications. Each TMI generated can have a TMI identifier (TMI-ID) that is uniquely associated with a corresponding specific application, which for purposes of discussion herein is generally presumed to be a particular VM.

Each instance of VM software can manage its own timers by providing timer commands to the timer manager controller. For example, a timer command can be written to a particular address (a command address) of the timer manager controller that includes a TMI identifier (TMI-ID) that identifies a particular TMI. The timer manager controller monitors the command address and upon receiving the timer command can interpret and implement the command. For example, a timer command can instruct the timer manager controller to create a timer, update a timer, delete a timer, and the like. In this way, the timer environment of a system can be maintained with reduced loading on the general purpose processors of the system, even when strict partitioning of resources needed in a highly virtualized processing system.

Figure 1:
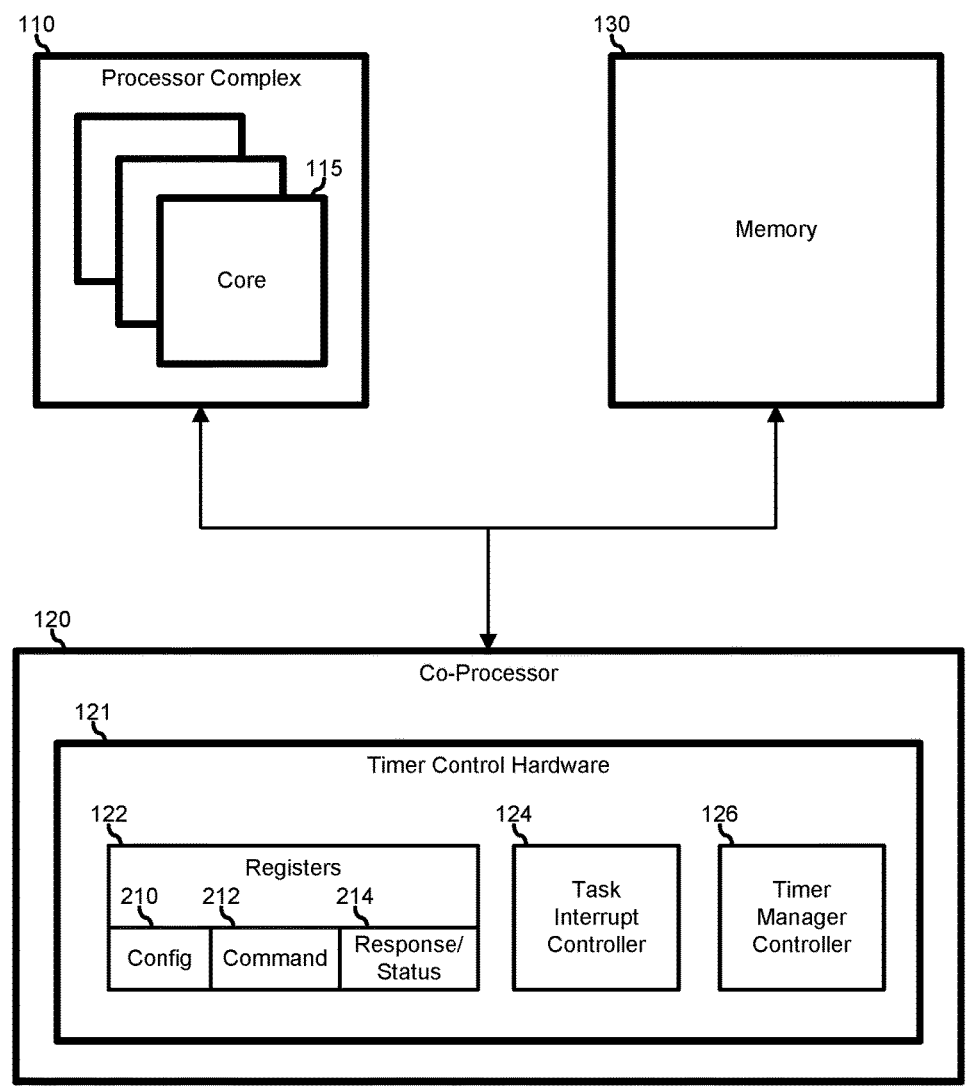
FIG. 1 is a block diagram of a processing system according to an embodiment of the present disclosure.

FIG. 1 illustrates a processing system 100 including a processor complex 110, a co-processor 120, and a memory 130. Processing system 100 represents a general purpose processing system that operates to perform various processing operations that can include network routing and switching, data storage and management, server virtualization, and other processing operations, as needed or desired. Processor complex 110 represents one or more monolithic integrated circuit devices, including one or more processor cores 115 that operate to execute machine executable code, and other hardware devices, such as caches, controllers, input/output devices, hardware interfaces, volatile or non-volatile memories, data storage devices, and the like. Memory 130 represents a storage medium for long term or short term storage of data, information, and code for processing system 100. In particular, memory 130 can include various volatile and non-volatile memory devices, solid state memory, a disk drive or storage array, or other storage media, as needed or desired.

Co-processor 120 represents a circuit or device to perform various operations that may be routine or repetitive. As illustrated, co-processor 120 includes timer control hardware 121 that implements timer operations that would pose a large burden on the processing resources of processor complex 110, were the processor complex to perform the timer operations by itself. Timer manager controller 126 represents a circuit portion of timer control hardware 121 to perform the timer operations, as described below. Task interrupt controller 124 represents a circuit portion of timer control hardware 121 that provides interrupt support to the timer manager controller 126. Registers 122 represent register locations accessible by processor complex 110 and co-processor 120 that can be used to support operation of timer manager controller 126.

Processor complex 110 executes various instructions received from a memory, such as memory 130, or from another device of processing system 100. The applications executing at processor complex 110 may have a need for one or more timers as can be implemented by timer control hardware 121. As such, the timer operations of timer control hardware 121 can be accessed by software procedures that send timer commands to the timer control hardware, thereby directing the timer control hardware to implement specified timer operations. The timer commands include information needed by timer control hardware 121 to identify and implement the timer operations at a particular timer or timers. Note that timer control hardware 121 can provide call-backs, e.g., notification, to the procedures to indicate that a requested timer operation has been received, or completed. As such, an application that requested a particular timer operation can include callback handler software that receives and processes an associated call-back.

The location of registers 122 can be set by a base address that is stored in another register location of the co-processor 120, or elsewhere. Register 210 (CONFIG) is a configuration register that can be accessed by the processor complex 110 to store configuration information used by timer manager controller 126. For example, the configuration information can include a time base for processing system 100, a base address for other registers accessible by timer manager controller 126, or other system level configuration information, as needed or desired. Registers 122 also include a command register 212 (COMMAND) and a response/status register 214 (RESPONSE/STATUS).

Command register 212 operates to receive timer commands from processor complex 110 that are interpreted by timer manager controller 126 to invoke various timer operations. Co-processor 120 can communicate response and status information to processor complex 110 by storing response/status information in a response/status register 214 that is in turn accessed by the processor complex 110, for example, in response to receiving an interrupt from the task interrupt controller 124. The operation of configuration register 210, command register 212, and response/status register 214 will be discussed more fully below with respect to FIG. 3.

In a particular embodiment, command register 212 includes an operation-type field. When processor complex 110 writes a timer command to command register 212, timer manager controller 126 interprets the contents of the operation-type field of command register 212 to determine how to process the timer command. For example, the presence of a particular operation type in the operation-type field of command register 212 will indicate to timer manager controller 126 to invoke a particular operation. Similarly, response/status register 214 includes an operation-type field. When an invoked operation of timer manager controller 126 stores response or status information to response/status register 214, it can include the operation type associated with operation in an operation-type field of response/status register 214, so that the recipient knows what kind of information is being provided.

In one embodiment, once status/response information is stored at register 214, task interrupt controller 124 sends an interrupt to the processor complex 110, thus notifying the processor complex 110 of the pending information. In another embodiment, instead of communicating through various registers, co-processor 120 can have dedicated ports that interface directly with timer control hardware 121, wherein read and write accesses to registers are not needed. For purposes of discussion, it is presumed that the timer communications primarily occur through registers 122.

For ease of discussion, it is presumed herein that a timer command from processor complex 110 represents a write to command register 212 that, when interpreted by timer manager controller 126, invokes a particular hardware portion of the co-processor 120 to perform an indicated operation. In response to a timer command, the invoked hardware portion can provide an operation response that is indicated to processor complex 110. For example, an indicator can be provided that the co-processor 120 has received the timer command, or that the co-processor has completed the timer command. An operation response to processor complex 110 represents a write by timer management controller 126 to response/status register 214, and a corresponding read from response/status register 214 by processor complex 110.

In a different embodiment, not illustrated, instead of having a generic command register 212, that includes an operation-type, different data storage locations in registers 122 can be associated with dedicated operation-types, obviating the need to store a specific operation-type. For example, a first data storage location of registers 122 may be associated with a portion of timer manager controller 126 that executes an operation for creating a timer, while a second data storage location may be associated with a different operation that causes a portion of the hardware to delete a timer. According to this embodiment, processor complex 110 stores timer commands to different storage locations of registers 122 to invoke execution of different operations by different hardware portions of co-processor 120 to perform the timer operations associated with the hardware portions.

TABLE 1

Command Register
Base Memory Address + Offset: 0x20

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| Operation type | | | | | | | | | | Optional | | | | | |

An example of command register 212 is shown in Table 1, above. Here, command register 212 is represented as two (2) bytes of data that are associated with a memory of co-processor 120 at a specific offset from a base memory address. Here further, the first byte (offset=0x20) of command register 212 is associated with an operation type field that can be interpreted by timer manager controller 126 to invoke the various hardware operations associated with timer manager controller 126, as described below. The second byte (offset=0x21) is associated with an optional field that can include additional information that can be further interpreted, or otherwise used, by co-processor 120 to invoke various hardware portions of the co-processor, as needed or desired, depending upon the operation-type. Note that command register 212 may include more or fewer bits of memory for the operation-type field and for the optional field, as needed or desired. In particular, where a number of timers managed by timer control hardware 121 is large, for example, in excess of 16 million different timers and their associated timer identifiers, the optional field may need to include 24 or more bits of memory, as needed or desired.

An example of a response/status register 214 is shown in Table 2, below. Here, response/status register 214 can be represented as two (2) bytes of data stored at offset 0x22 from the base memory address. The first byte (offset=0x22) of response/status register 214 is associated with a response code field that can be written by the timer manager to indicate to processor complex 110 that particular status information is being provided to a core of the processor complex. For example, the particular status can indicate that a particular operation has been received from command registers 212. The second byte (offset=0x23) is an optional field that can return information corresponding the particular status code in the first byte, as needed or desired. Note that response/status register 214 may include more or fewer bits of memory for the response code field and for the option field, as needed or desired. In particular, as noted above, where a number of timers managed by timer control hardware 121 is large, for example, in excess of 16 million different timers and their associated timer identifiers, the optional field may need to include 24 or more bits of memory, as needed or desired.

TABLE 2

Response/Status Register
Hardware Context + Offset: 0x22

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| Response Code | | | | | | | | | | Optional | | | | | |

An operation response stored at the response/status field 216 represents a response by co-processor 120 to processor complex 110 that is proximate in time to the particular timer command to which the response is made, and typically indicates whether or not the timer command was successfully received by the co-processor. As such, a response stored in response/status field 216 does not typically indicate whether or not the timer command was successfully executed by co-processor 120. The proximate time can be a defined amount of time after a command is written. Timer manager controller 126 can also operate to provide call-backs to processor complex 110 at a later time, which is not deterministic, indicating whether or not the co-processor successfully executed the timer command. Call-backs also provide other status information related to the execution of the timer command.

In a particular embodiment, task interrupt controller 124 manages the call-backs such that each call-back is uniquely associated with a particular timer command, and calling application. Here, processing system 100 includes a mechanism whereby task interrupt controller 124 proactively informs processor complex 110 that an operation associated with a previous timer command has been completed. For example, processor complex 110 can include an interrupt handler, and task interrupt controller 124 can initiate an interrupt when a call-back is ready. Then, processor complex 110 can query the interrupt handler for the call-back information. In another example, task interrupt controller 124 can store call-back information in response/status register 214, and processor complex 110 can periodically poll the response/status register to determine if any call-backs have been stored. Then, in response to receiving a call-back, the application that issued the particular timer command can acknowledge the call-back by writing to a call-back completion confirmation (CBCC) to a CBCC register of registers 122 (not shown). The write to the CBCC register can include an identifier of the call-back. In this way, co-processor 120 can have multiple outstanding call-backs. When co-processor 120 receives a write to the CBCC register that is associated with the particular operation call-back, the operation is completed.

Timer manager controller 126 represents a hardware portion of co-processor 120 that offloads the management of timers from processor complex 110. In particular, timer manager controller 126 operates to manage the creation of specific instances of timer managers, referred to as timer manager instances (TMIs), which can include storing information to the TMI in memory 130. In a particular embodiment, each VM instantiated by processor complex 110 includes an associated TMI in order to preserve the parti-tioning of access to the resources of the virtualized environment. For example, processor complex 110 can provide an operating environment that includes a virtual machine manager (VMM) that instantiates one or more VMs. Here, the VMM can invoke timer manager controller 126 to establish a TMI for the exclusive use of itself and a separate TMI for the exclusive use of each VM. In a particular embodiment, all of the TMIs are established in a common portion of memory 130 that is set aside in processing system 100 for the allocation of TMIs and timers. In response to an operation request, timer manager controller 126 will only access that a portion of the memory associated with a TMI identified by the operation request. In another embodiment, the TMI associated with the VMM is established in a portion of memory 130 that is partitioned to the use of the VMM, and the TMIs associated with each VM are each established in the portions of the memory that are partition for the corresponding VMs. The portions of memory 130 that are allocated to the various TMIs are set as a protected memory portions that can only be accessed by timer manager controller 126. In this way, the timer operations for the VMM and for each VM are protected from tampering or other spurious memory accesses. It will be further appreciated that in an embodiment, each VM can also request of the VMM that separate TMIs be created that the VM can dedicate to supporting one or more of its applications.

Timer manager controller 126 operates to manage the creation of TMIs in memory 130 in response to a create-TMI command. For example, a VMM can issue a create-TMI command by writing a particular timer command to command register 212. As a result, timer manager controller 126 can create a TMI in a portion of memory 130 that is partitioned for the exclusive use of the VMM. Similarly, the VMM can issue a create-TMI command that requests timer manager controller 126 to create a TMI for a particular VM in a portion of the memory that is partitioned for the use of the particular VM.

In response to receiving a create-TMI command, timer manager controller 126 executes a create-TMI operation that allocates a portion of memory 130 to the newly created TMI. As such, a create-TMI command can include a timer number field in the second byte (offset=0x21) of command register 212 that defines the maximum number of timers that the newly created TMI will support, and the size of the portion of memory 130 that is dedicated to a newly created TMI is determined based upon the contents of the timer number field. Note that typically the number of timers required will require a much larger memory space than the exemplary second byte. In a particular embodiment, each individual timer requires an allocation of 64 bytes of data. In this case, a newly created TMI will be allocated a portion of memory 130 having a size given as:

$$\text{Size} = (N \times 64 \text{ bytes}) + C \qquad \text{Equation 1}$$

where N is the number of individual timers that the TMI will support, as specified by the timer number field, and C represents an additional overhead of memory space for control values associated with the newly created TMI. The create-TMI command can also include a context field in the second byte (offset=0x21) of command register 212 that associates the TMI with a particular Access Management Qualifier (AMID) that identifies a particular entity of processor complex 110, on behalf of which the TMI is being created, and serves to distinguish one create-TMI command, for example to create a TMI for the VMM, from another create-TMI command, for example to create a TMI for a VM. The create-TMI command can also include an instance base address field in the second byte (offset=0x21) of command register 212 that includes a memory location at which to store the TMI.

In response to receiving a create-TMI command, timer manager controller 126 provides a create-TMI operation response. For example, timer manager controller 126 can write a create-TMI operation response to response/status register 214. The create-TMI operation can include a status field in the second byte (offset=0x23) of response/status register 214 indicating whether or not the new TMI was successfully created. A new TMI may not have been successfully created due to an illegal state or operation being initiated, in which case, a failure may need to be debugged to determine the root cause. Also, a new TMI may not have been successfully created due to an attempt to create more TMIs than are supported by timer manager controller 126. The create-TMI operation response can also include a TMI-ID field in the second byte (offset=0x23) of response/status register 214 that identifies the particular TMI, and which is used by timer manager API 136 for all further timer commands to the particular TMI. For example, if the create-TMI command was provided by a VMM of processing system 100, then a value will be supplied in the TMI-ID field of the create-TMI operation response that uniquely identifies the newly created TMI, and all further timer commands from the VMM to that newly created TMI will be identified as being associated with the newly created TMI by the inclusion of the particular value. In a particular embodiment, timer manager controller 126 can launch and manage up to 252 TMIs.

Timer manager controller 126 further operates to manage the creation of one or more timers in the TMIs in response to a create-timer command. For example, a VM can issue a create-timer command by writing a particular timer command to command register 212. Here, the VM can issue a create-timer command to timer manager controller 126 to create a timer in the TMI that is associated with the VM. For example, the create-timer command can include a timer-ID field in the second byte (offset=0x21) of command register 212 that identifies the particular TMI into which to create the requested timer. The create-timer command can also include a timer-type field in the second byte (offset=0x21) of command register 212 that defines whether the timer is a periodic timer or a one-shot timer. If the timer-type field defines the timer as a periodic timer, then, when the timer expires, the periodic timer is automatically reset and begins to mark a new timer duration. On the other hand, if the timer-type field defines the timer as a one-shot timer, then, when the timer expires, the one-shot timer is not reset, no new timer durations are begun for that timer, and the timer can be deleted.

The create-timer command can also include a resolution field and a duration field in the second byte (offset=0x21) of command register 212. The resolution field defines a timer resolution for the timer. Co-processor 120 can include a clock that provides a clock tick having a predetermined duration. In a particular embodiment, the resolution field can include any number of clock ticks, up to a predetermined maximum. Here, the resolution field effectively defines a number of clock ticks in a timer tick as:

$$T = C \times R \qquad \text{Equation 2}$$

where T is the duration of the timer, C is the duration of a clock tick, and R is the resolution provided from the resolution field. For example, if a clock tick has a 1 microsecond (μsec) duration, and the resolution field stores the number 10 (ten), then the timer created in response to the create-timer operation will have a timer tick of 10 μsec. In another embodiment, the resolution field encodes one of a predefined number of resolutions. For example, the resolution of a timer may be selected from predefined resolutions of 1 μsec, 10 μsec, 100 μsec, 1 millisecond (msec), 10 msec, 100 msec, or 1 second. The duration field defines a number of timer ticks at which time the timer will expire, up to a predetermined maximum. As such, a timer will expire at an expiration time given as:

$$E = T \times D \qquad \text{Equation 3}$$

where E is the expiration time and D is the duration provided from the duration field. For example, if the timer resolution is selected as 1 msec, and the duration field stores the number 156, then the timer will expire 156 msec after the timer is created. Here, the expiration time E is stored in the particular timer of the particular TMI, and the timer is linked in the linked list based upon the expiration time E.

In a particular embodiment, the timer duration field is a 16 bit field. In a particular embodiment, the expiration time of a particular timer is given in terms of an expiration date that is relative to a clock date at the time the timer is created. Here:

$$ED = (T \times D) + \text{Clock} \qquad \text{Equation 4}$$

where ED is the expiration date and Clock is the value of a clock at the time that the create-timer command is received by timer manager controller 126. For example, if a clock counter of co-processor 120 stores a value of 500 when timer manager controller 126 receives a create-timer command, and the duration field includes a value of 500 ticks, then the timer created by the create-timer command will have an expiration date of 1000, and the timer will expire when the clock counter stores a value of 1000. Here, the expiration date ED is stored in the particular timer of the particular TMI, and the timer is linked in the linked list based upon the expiration date ED.

In response to receiving a create-timer command, timer manager controller 126 provides a create-timer operation response. For example, timer manager controller 126 can provide a create-timer operation response by writing response information to response/status register 214. The create-timer operation response can include a status field in the second byte (offset=0x23) of response/status register 214 indicating whether or not the new timer was successfully created. A new timer may not have been successfully created because the maximum number of timers in the associated TMI has been reached, and the present create-timer command would result in the number of timers that exceed the maximum. The create-timer operation response can also include a timer-ID field that identifies the particular timer.

When a timer expires, timer manager controller 126 operates to generate a timer call-back to alert processor complex 110 that a timer has expired. For example, timer manager controller 126 can provide an interrupt to processor complex 110 that includes timer call-back information, or the timer manager controller can write the timer call-back information to response/status register 214. The timer call-back information can include the timer ID so that the procedure of processor complex 110 that created the timer can determine what to do in response to the time out. Then, in response to receiving the timer call-back, the procedure can acknowledge the timer call-back by writing to a call-back completion confirmation to the CBCC register. The write to the CBCC register can include an identifier of the timer call-back. When co-processor 120 receives a write to the CBCC register that is associated with the timer call-back, the timer operation is completed. Then, if the timer is a one-shot timer, the timer slot in the TMI is freed up to create a new timer. On the other hand, if the timer is a periodic timer, the expiration time (E) of the timer is updated, and the timer is relaunched.

Timer manager controller 126 can also operate to manage the deletion of timers from the associated TMI in response to a delete-timer command. For example, a VM can issue a delete-timer command by writing a particular timer command to command register 212. Here, where the VM has invoked a particular timer as a time out for receiving packets in a frame, the VM can have successfully received all of the packets, and therefore is no longer in need of the particular timer, and the VM can issue a delete-timer command to timer manager controller 126 to delete the associated timer from the associated TMI. The delete-timer command can include a timer-ID in the second byte (offset=0x21) of command register 212 that identifies the particular timer that is to be deleted, and a TMI-ID field in the second byte (offset=0x21) of command register 212 that identifies the TMI. In a particular embodiment, the delete-timer command can include an expiration-type field in the second byte (offset=0x21) of command register 212 that defines the expiration behavior associated with the delete-timer operation. The behavior can include deleting a timer without providing a delete-timer operation response, forcing the expiration of a timer and then deleting the timer, and deleting a timer gracefully, that is, after the timer expires. Note that timer manager controller 126 also operates to manage the deletion of timers from the associated TMI in response to a time out of a one-shot timer.

In response to the delete-timer command, timer manager controller 126 provides a delete-timer operation response, indicating whether or not the delete-timer command was accepted by timer manager controller 126. For example, timer manager controller 126 can provide a delete-timer operation response by writing response information to response/status register 214.

As noted above, when a timer expires, timer manager controller 126 generates a timer call-back to alert processor complex 110 that a timer has expired. As such, when the expiration-type field of a delete-timer command specifies forcing the expiration of a timer and then deleting the timer, or specifies deleting a timer gracefully after the timer expires, timer manager controller 126 generates a delete-timer call-back to alert processor complex 110 that the timer has been deleted. For example, timer manager controller 126 can provide an interrupt to processor complex 110 that includes delete-timer call-back information, or the timer manager controller can write the delete-timer call-back information to response/status register 214. Finally, processor complex 110 can acknowledge the delete-timer call-back by writing a call-back completion confirmation to the CBCC register.

Timer manager controller 126 also operates to manage the deletion of TMIs from memory 130 in response to a delete-TMI command. For example, a VMM can issue a delete-TMI command by writing a particular timer command to command register 212. Here, when the VMM deallocates a VM from processing system 100, the VMM can issue the delete-TMI command to timer manager controller 126 to delete the TMI that is associated with the deallocated VM from memory 130. The delete-TMI command can include a TMI-ID field in the second byte (offset=0x21) of command register 212 that identifies the particular TMI that is to be deleted. The delete-TMI command can also include a force-expiration field in the second byte (offset=0x21) of command register 212 that defines whether or not to force the expiration of any unexpired timers in the TMI. For example, where a VMM is operating to migrate a particular VM to another server, it may be desirable to let all of the timers in the associated TMI expire at their appointed time, so that the associated tasks in the VM can terminate normally. On the other hand, where processing system 100 is being power cycled, due to, for example, a thermal or power overload, it may be desirable to force all unexpired timers to time out, in order to quickly shut down or otherwise reduce the operating state of the processing system.

In response to receiving a delete-TMI command, timer manager controller 126 provides a delete-TMI operation response, indicating whether or not the delete-TMI command was accepted by timer manager controller 126. For example, timer manager controller 126 can provide a delete-TMI operation response by writing response information to response/status register 214. Under normal circumstances, the delete-TMI operation response will indicate that timer manager controller 126 accepted the delete-TMI command. However, if timer manager controller 126 is already processing a delete-TMI command to delete a TMI when the timer manager controller receives a new delete-TMI command to delete another TMI, then the delete-TMI operation response will indicate that timer manager controller 126 has not accepted the delete-TMI command.

When timer manager controller 126 receives a delete-TMI command, the timer manager controller does not immediately delete the TMI, but first the timer manager controller deletes all of the active timers that may be running in the TMI. Timer manager controller 126 forces all unexpired timers to be expired and deletes the timers if the force-expiration field is set, or timer manager controller 126 deletes all of the active timers as they expire if the force-expiration field of the delete-TMI command is not set. In either case, when all timers are deleted, timer manager controller 126 deletes the portion of memory 130 associated with the TMI. When all timers and the TMI are successfully deleted, timer manager controller 126 directs co-processor 120 to initiate a task associated with the delete-TMI command that informs processor complex 110 of the successful deletion of the TMI, as described more fully, below.

As noted above, when timer manager controller 126 accepts a delete-TMI command, the timer manager controller forces all unexpired timers to be expired if the force-expiration field is set, or the timer manager controller deletes all timers as they expire if the force-expiration field of the delete-TMI command is not set. However, timer manager controller 126 does not immediately generate a delete-TMI call-back to alert processor complex 110 that the timer instance has been deleted. Instead, the delete-TMI call-back is held until all outstanding delete-timer call-backs have been acknowledged, and then the delete-TMI call-back is generated. For example, timer manager controller 126 can provide an interrupt to processor complex 110 that includes delete-TMI call-back information, or the timer manager controller can write the delete-TMI call-back information to response/status register 214. Finally, processor complex 110 can acknowledge the delete-TMI call-back by writing a call-back completion confirmation to the CBCC register.

Timer manager controller 126 further operates to manage queries to a TMI in response to a query-TMI command. For example, a VMM can issue a query-TMI command by writing a particular timer command to command register 212. The query-TMI command can include the TMI-ID field in the second byte (offset=0x21) of command register 212 that identifies the TMI to be queried. In response to receiving a query-TMI command, timer manager controller 126 provides a query-TMI operation response. For example, timer manager controller 126 can provide a query-TMI operation response by writing response information to response/status register 214. The query-TMI operation response can include a status field in the second byte (offset=0x23) of response/status register 214 indicating whether or not the query was successfully performed. In a particular embodiment, the query-TMI operation response includes a default status in the status field that indicates that the query was performed by timer manager controller 126.

When timer manager controller 126 receives a query-TMI command, the timer manager controller performs an analysis of the identified TMI. For example, timer manager controller 126 can determine a number of active timers in the TMI, can determine the types of timers in the TMI, can determine an expiration time or an expiration date and a timer-ID of a next timer to expire, can determine an expiration time or an expiration date and a timer-ID of a last timer to expire, or other information, as needed or desired. Such an analysis can take some significant amount of time to perform on a TMI, and so, at some later time, when the query is completed, timer manager controller 126 generates a TMI query call-back to alert co-processor 120 that a query has been completed. For example, timer manager controller 126 can provide an interrupt to processor complex 110 that includes query-TMI call-back information, or the timer manager controller can write the query-TMI call-back information to response/status register 214. Finally, processor complex 110 can acknowledge the TMI query call-back by writing a call-back completion confirmation to the CBCC register.

Timer manager controller 126 further operates to manage the query of an individual timer in a TMI in response to a query-timer command. For example, a VMM can issue a query-timer command by writing a particular timer command to command register 212. The query-timer command can include a TMI-ID field in the second byte (offset=0x21) of command register 212 that identifies the TMI to be queried and a timer-ID field that identifies the particular timer. In response to receiving a query-timer command, timer manager controller 126 provides a query-timer operation response. For example, timer manager controller 126 can provide a query-timer operation response by writing response information to response/status register 214. The query-timer operation response can include a status field indicating whether or not the query was successfully performed. In a particular embodiment, the query-timer operation response includes a default status in the status field that indicates that the query was performed by timer manager controller 126.

When timer manager controller 126 receives a query-timer command, the timer manager controller performs an analysis of the identified TMI. For example, timer manager controller 126 can determine the type of the timer, an expiration time or an expiration date of the timer, or other information, as needed or desired. Such an analysis can take some significant amount of time to perform on a timer, and so, at some later time, when the query is completed, timer manager controller 126 generates a timer query call-back to alert co-processor 120 that a timer query has been completed. For example, timer manager controller 126 can provide an interrupt to processor complex 110 that includes query-timer call-back information, or the timer manager controller can write the timer query call-back information to response/status register 214. Finally, processor complex 110 can acknowledge the timer query call-back by writing a call-back completion confirmation to the CBCC register.

Timer manager controller 126 further operates to modify a particular timer in response to a modify-timer command. For example, a VMM can issue a modify-timer command by writing a particular timer command to command register 212. The modify-timer command can include a TMI-ID field in the second byte (offset=0x21) of command register 212 that identifies the TMI to be queried and a timer-ID field in the second byte (offset=0x21) of command register 212 that identifies the particular timer. The modify-timer command can also include a timer-type field in the second byte (offset=0x21) of command register 212 that defines whether the modified timer is a periodic timer or a one-shot timer. The modify-timer command can also include a resolution field and a duration field in the second byte (offset=0x21) of command register 212 for the modified timer. In response to receiving a modify-timer command, timer manager controller 126 provides a modify-timer operation response. For example, timer manager controller 126 can provide a modify-timer operation response by writing response information to response/status register 214. The modify-timer operation response can include a status field indicating whether or not the timer was successfully modified.

Timer manager controller 126 further operates to recharge a particular timer in response to a recharge-timer command. For example, a VMM can issue a recharge-timer command by writing a particular timer command to command register 212. The recharge-timer command can include a TMI-ID field in the second byte (offset=0x21) of command register 212 that identifies the TMI to be queried and a timer-ID field in the second byte (offset=0x21) of command register 212 that identifies the particular timer. In response to the recharge-timer command, timer manager controller 126 recalculates the expiration time or expiration data for the timer from the time that the recharge-timer command is received. In response to receiving a recharge-timer command, timer manager controller 126 provides a recharge-timer operation response. For example, timer manager controller 126 can provide a recharge-timer operation response by writing response information to response/status register 214. The modify-timer operation response can include a status field indicating whether or not the timer was successfully recharged.

Timer manager controller 126 further operates to provide status information regarding the operation of the timer manager controller, the instantiated TMIs, and the timers in the TMIs. For example, timer manager controller 126 can provide information regarding the overall number of TMIs and timers that have been created, the overall number of TMIs and timers that have been deleted, a number of active timers that are being managed by the timer manager controller, the number of timer expirations that have occurred, the number of timer recharges that have occurred, the number of timers that have been modified, the number of call-backs that have been issued, the number of outstanding call-backs that are pending, or other information, as needed or desired.

Figure 2:
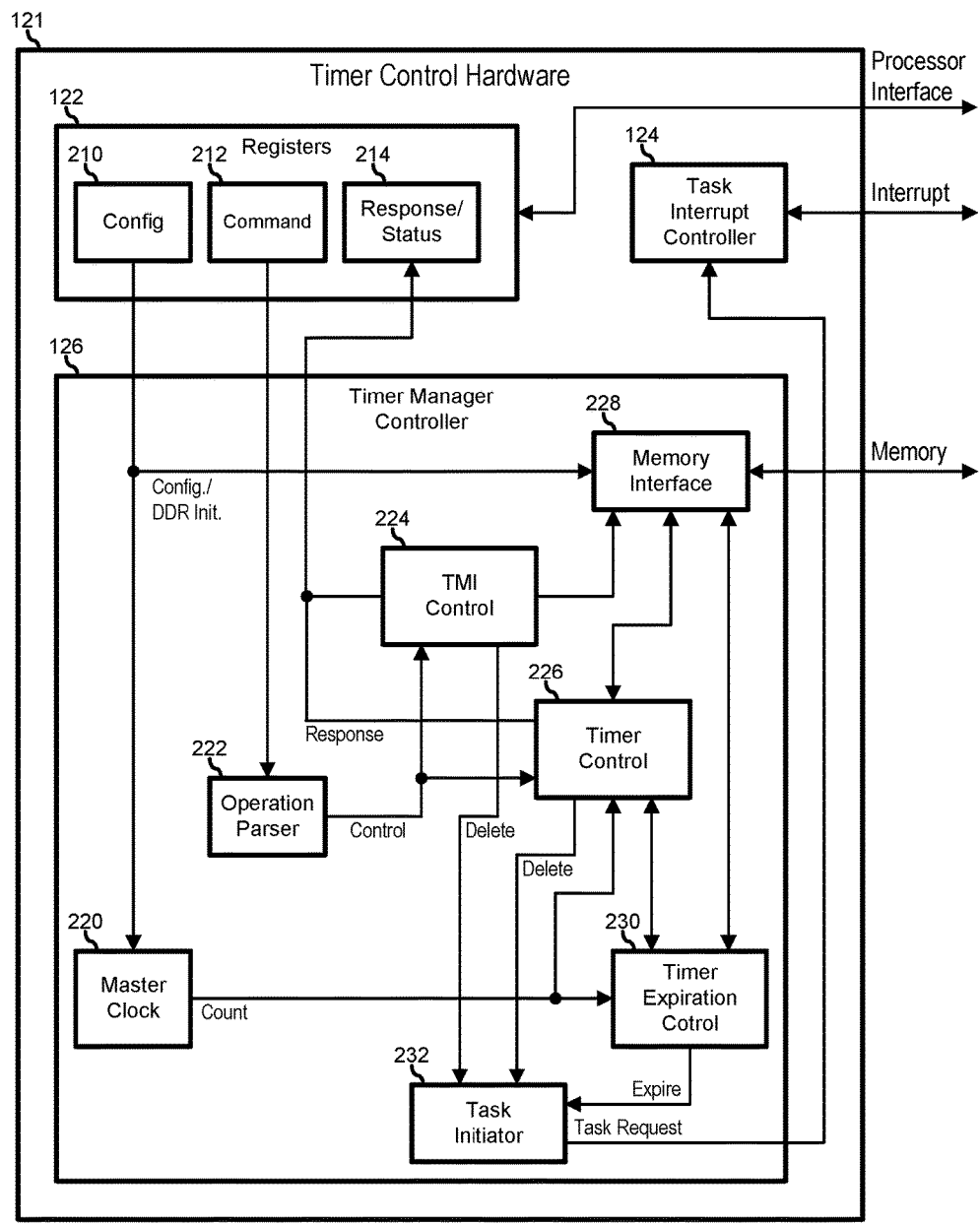
FIG. 2 is a block diagram of a timer manager controller of the processing system of FIG. 1 according to an embodiment of the present disclosure.

FIG. 2 is a block diagram of the portion 121 that is used to implement the timer manager function described herein. Specifically illustrated are registers 122, task interrupt controller 124, and timer manager controller 126. Timer manager controller 126 includes a master clock module 220, an operation parser module 222, a TMI control module 224, a timer control module 226, a memory interface module 228, a timer expiration control module 230, and a task initiator module 232. Registers 122 are connected to a processor interface to conduct register read and write transactions with processor complex 110, as needed or desired. Task interrupt controller 124 is connected to an interrupt interface of processor complex 110 to receive task completion interrupts, as needed or desired. Memory interface 228 is connected to memory 130 to manage the creation and deletion of TMIs and timers in the memory.

Processor complex 110 writes system level configuration information for co-processor 120 to configuration register 210. The system level configuration information relates to the configuration of co-processor 120, and is not necessarily related to a particular TMI or timer. Master clock module 220 is connected to configuration register 210 to receive the system level configuration information. For example, the system configuration information stored in configuration register 210 can operate to configure master clock module 220 to divide a system clock for co-processor 120 into a clock tick having a predetermined duration, or to configure the master clock module to contain a preset count value. Memory interface module 228 is also connected to configuration register 210 to receive memory initialization information for memory 130.

Processor complex 110 also writes command information for co-processor 120 to command register 212. The command information includes the various commands related to TMI and timer commands that are provided to timer manager controller 126, and that direct the timer manager controller to perform the specified operations, as described above. Operation parser module 222 is connected to command register 212 to receive the commands. As noted above, command register 212 includes an operation-type field that is interpreted by operation parser module 222 to determine which timer operation is being invoked by the commands. Operation parser module 222 is connected to TMI control module 224 and to timer control module 226 to provide control information to the modules. Operation parser module 222 can determine if an operation is a create-TMI operation, a create-timer operation, a delete-timer operation, or a delete-TMI operation.

If operation parser module 222 determines that an operation is a create-TMI operation, the operation parser module forwards the appropriate control information (i.e., control signals or other information) to TMI control module 224. The control information can include timer number information, context information, and instance base address information, or other information, as needed or desired. TMI control module 224 is connected to response/status register 214, and operates to determine if the create-TMI operation could be performed and to provide a response to the response/status register that includes an indication as to whether or not the TMI was created, and, if appropriate, the TMI-ID of the newly created TMI. TMI control module 224 is also connected to memory interface module 228, and operates to provide TMI information to the memory interface module. Based upon the received TMI information, memory interface module 228 creates the TMI in memory 130. The TMI is created at a location indicated by the instance base address information in the create-TMI operation, is allocated an amount of the memory that is determined by the timer number information in the create-TMI operation, and is associated with a particular agent of processor complex 110 based upon the context information in the create-TMI operation.

If operation parser module 222 determines that an operation is a create-timer operation, the operation parser module forwards the appropriate control information to timer control module 226. The control information can include a TMI-ID of the TMI into which to create the timer, timer-type information, resolution information, and duration information. Timer control module 226 is connected to response/status register 214, and operates to determine if the create-timer operation could be performed and to provide a response to the response/status register that includes an indication as to whether or not the timer was created, and, if appropriate, the timer-ID of the newly created timer. Timer control module 226 is also connected to master clock module 220 to receive the clock count in order to determine the expiration time or the expiration date of the timer. Timer control module 226 is also connected to memory interface module 228, and operates to provide timer information to the memory interface module. Based upon the received timer information, memory interface module 228 creates the timer in the identified TMI memory 130.

If operation parser module 222 determines that an operation is a delete-timer operation, the operation parser module forwards the appropriate control information to timer control module 226. The control information can include a TMI-ID of the TMI from which to delete the timer, the timer-ID information of the timer to be deleted, and the expiration-type information for the timer to be deleted. Timer control module 226 operates to determine if the delete-timer operation could be performed and to provide a response to response/status register 214 that includes an indication as to whether or not the timer was deleted. If the expiration-type information indicates that the timer is to be deleted without providing a response, then timer control module 226 suppresses any response to response/status register 214. If the expiration-type information indicates that the timer is to be forced to expire before deleting the timer, timer control module 226 directs memory interface module 228 to fetch the timer and deliver the timer to timer expiration control module 230 to handle the forced expiration of the timer. If the expiration-type information indicates that the timer is to be allowed to expire before deleting the timer, timer control module 226 monitors timer expiration control module 230 to determine when the timer has expired and the expiration module handles the expiration of the timer when the timer expires.

Timer control module 226 is connected to task initiator module 232. When timer control module 226 determines from timer expiration control module 230 that a timer that is to be deleted has expired, either by being forced to expire or by allowing the timer to expire gracefully, the timer control module directs memory interface module 228 to delete the timer and provides an indication to task initiator module 232 that the timer has been deleted. Task initiator module 232 is connected to task interrupt controller 124. When task initiator module 232 receives the indication from timer control module 226 that the timer has been deleted, the task initiator module sends a task request to task interrupt controller 126 to generate an interrupt to processor complex 110, indicating that the timer has been deleted.

If operation parser module 222 determines that an operation is a delete-TMI operation, the operation parser module forwards the appropriate control information to TMI control module 224 and to timer control module 226. The control information can include the TMI-ID of the TMI to be deleted and the force-expiration information for the timers in the TMI. Timer control module 226 then deletes the timers of the TMI as indicated by the force-expiration information, providing an indication to task initiator module 232 when each timer is deleted.

TMI control module 224 is connected to task initiator module 232. When all timers of the TMI have been deleted, TMI control module 224 directs memory interface 228 to delete the TMI and the TMI control module provides an indication to task initiator module 232 that the TMI has been deleted. When task initiator module 232 receives the indication from TMI control module 224 that the TMI has been deleted, the task initiator module sends a task request to task interrupt controller 126 to generate an interrupt to processor complex 110, indicating that the TMI has been deleted.

Figure 3:
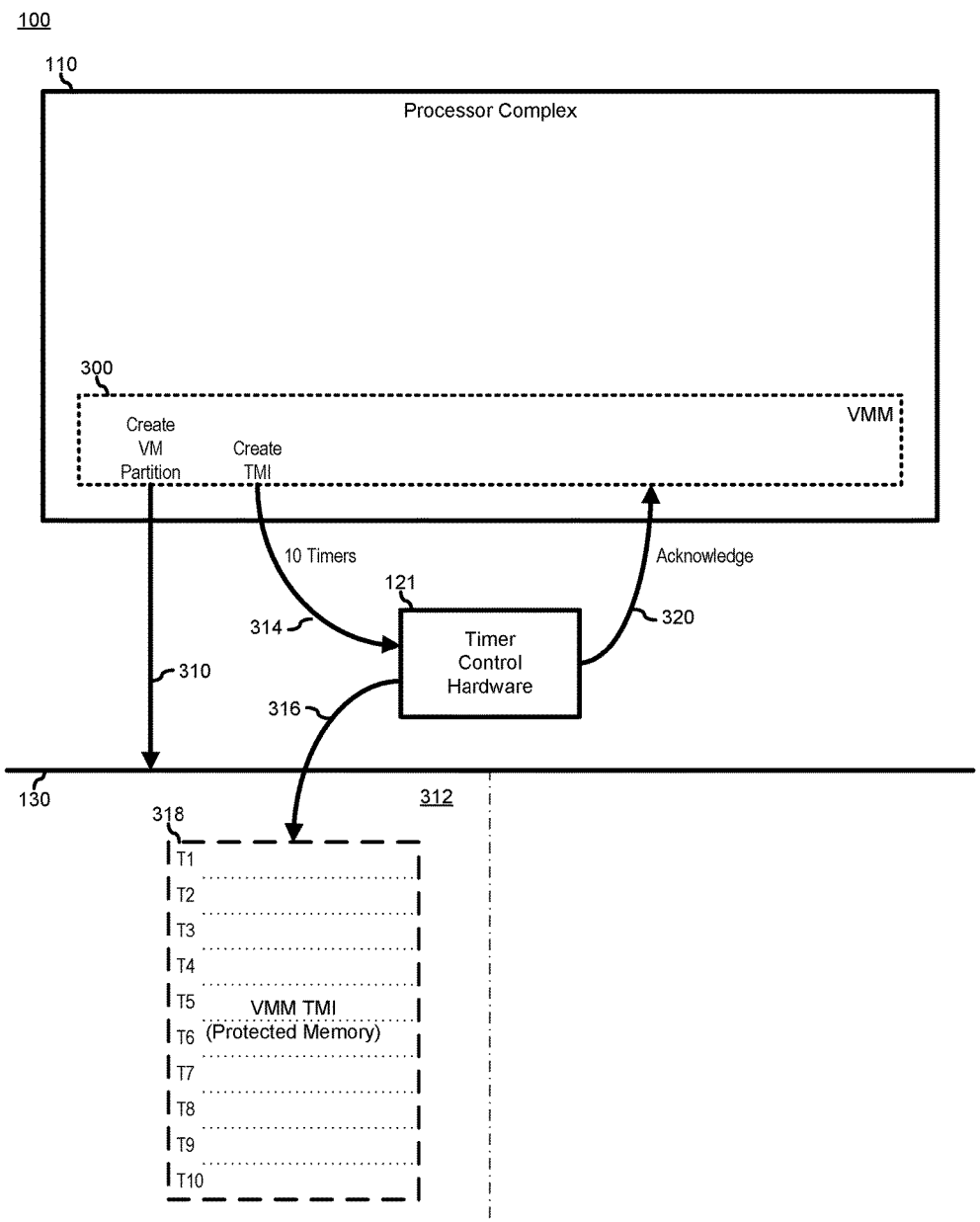
FIGS. 3-5 illustrate the processing system of FIG. 1 and a method of instantiating timers thereon according to an embodiment of the present disclosure.
Figure 4:
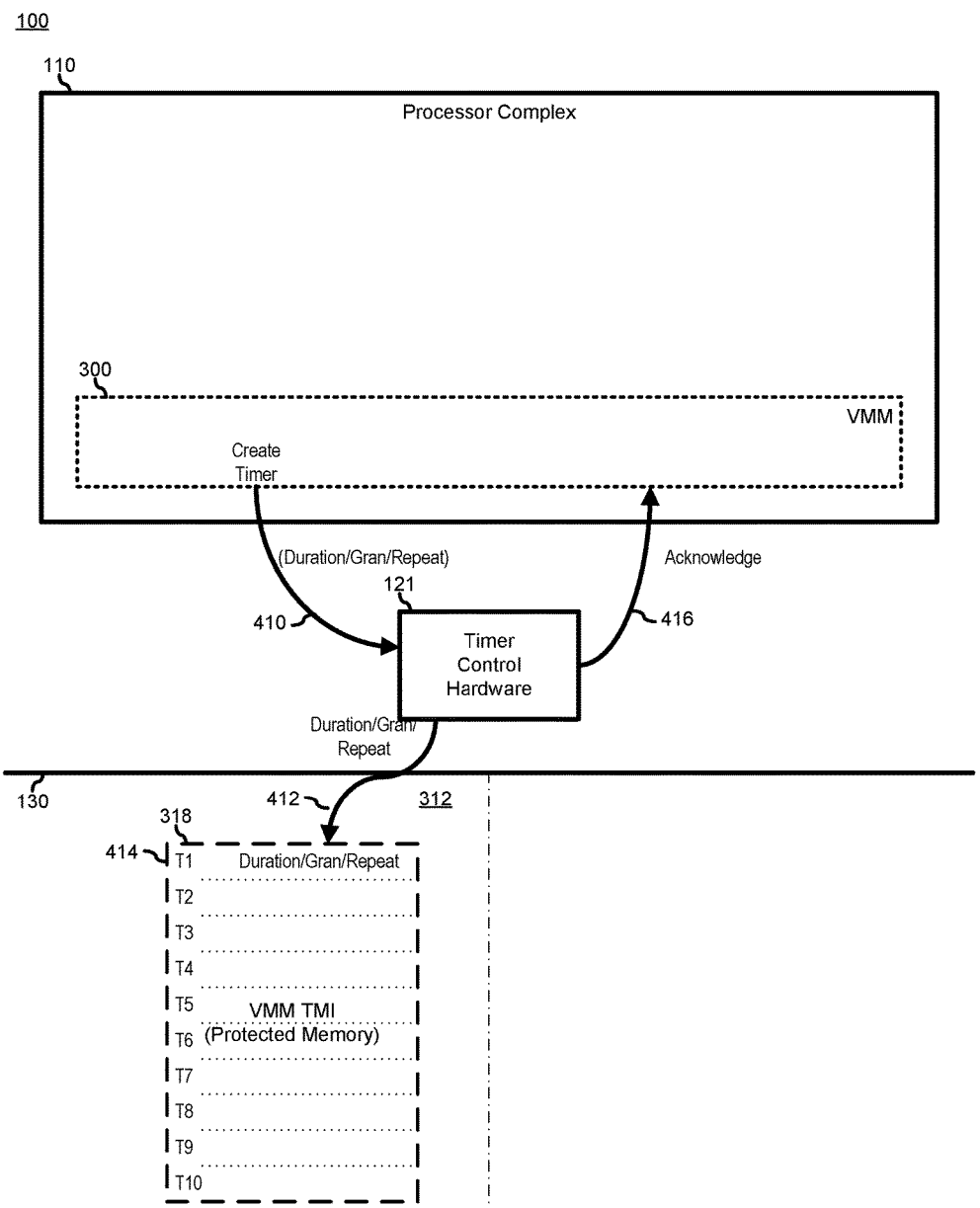
Figure 5:
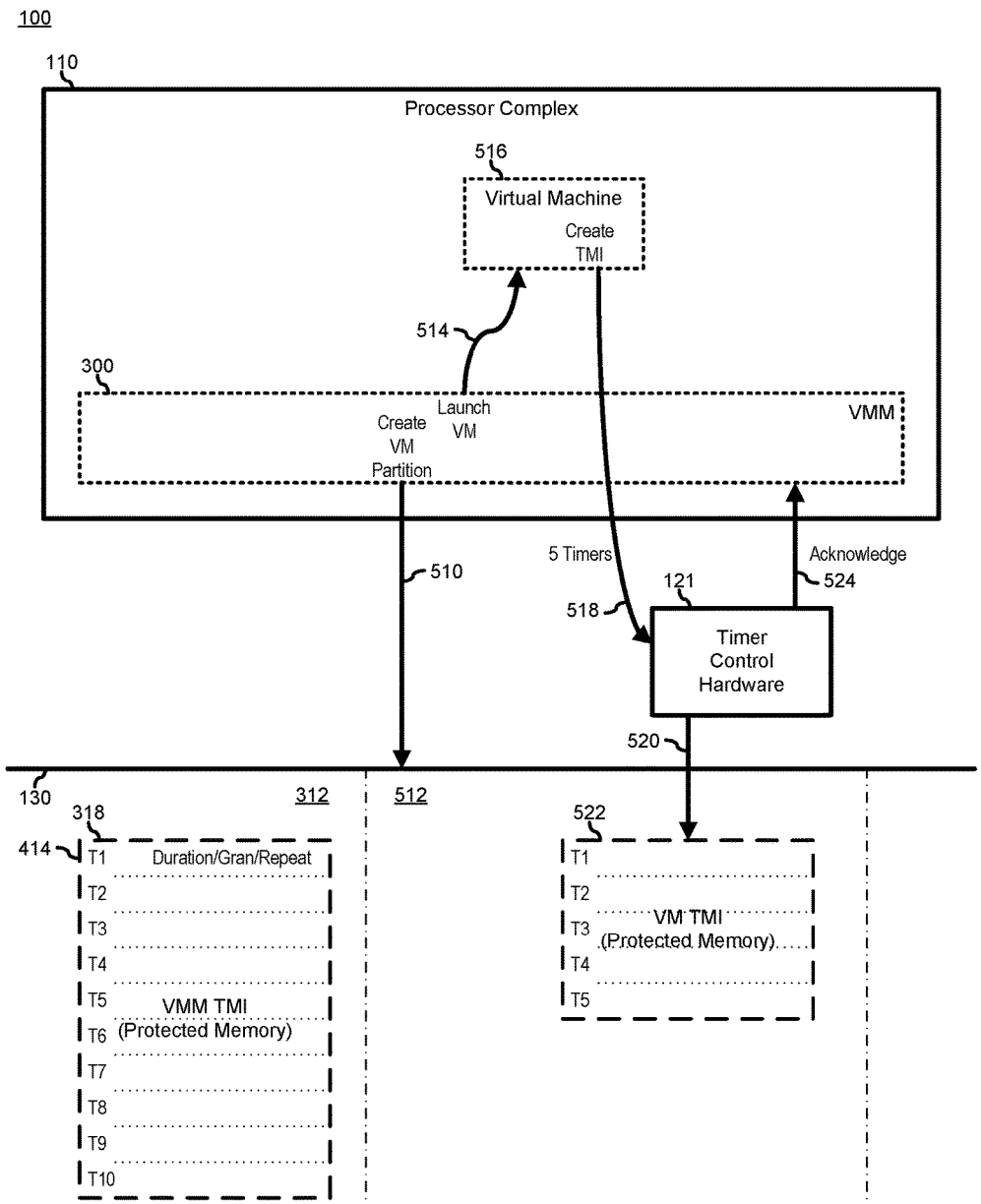

FIGS. 3-5 illustrate a method of instantiating TMIs and timers on processing system 100. In FIG. 3, processor complex 110 is shown as instantiating a VMM 300. Instantiation of VMM 300 initiates a step 310 that partitions a portion of memory 130, VMM partition 312, for purposes of supporting VMM 200. Next, in a step 314, VMM 300 issues a create-TMI command 314 to timer control hardware 121 to create a TMI for itself. Create-TMI command 314 includes a timer number field value of ten (10), and so timer control hardware 121 allocates a VMM TMI 318 in a step 316 that includes storage locations for ten (10) timers in VMM partition 312. In a particular embodiment, the location of VMM TMI 318 in VMM partition 312 is indicated by a base address field of the create-TMI command 314. In another embodiment, timer control hardware 121 determines the base address of BMM TMI 318. Time manager 120 then issues a create-TMI operation response 320 to VMM 300, acknowledging the receipt of create-TMI command 314. If, for any reason, timer control hardware 121 is unable to create VMM TMI 318, create-TMI operation response 320 will include an indication as to why the VMM TMI was not created.

In FIG. 4, VMM 300 issues a create-timer command 410 to timer control hardware 121 to create a timer 414 in TMI 318. Create-timer command 410 includes a duration field, a resolution field, and a timer-type field. Timer control hardware 121 creates a timer 414 at location T1 in VMM TMI 318. Time manager 120 then issues a response or status to the create-timer command in a step 416 to VMM 300, acknowledging the receipt of create-timer command 410, for example. If, for any reason, timer control hardware 121 is unable to create timer 414, create-timer operation response 416 will include an indication as to why the timer was not created.

In FIG. 5, as part of instantiating a VM, VMM 300 initiates a step 510 to create a VM partition 510 in memory 130, and initiates the VM via step 516 that is associated with VM partition 510. Next, in a step 518, VM 516 issues a create-TMI command 518 to timer control hardware 121 to create a TMI for itself. Create-TMI command 518 includes a timer number field value of five (5), and so timer control hardware 121 allocates a VM TMI 522 that includes storage locations for five (5) timers in VM partition 512. Time manager 120 then issues a create-TMI operation response 524 to VM 516, acknowledging the receipt of create-TMI command 518. If, for any reason, timer control hardware 121 is unable to create VM TMI 522, create-TMI operation response 524 will include an indication as to why the VMM TMI was not created.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed processing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited operation and not only structural equivalents, but also equivalent structures.

When referred to as a "device," a "module," or the like, the embodiments described herein can be configured as hardware. For example, a portion of a processing system may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Where referred to as a "hardware portion" or the like, the embodiments described herein can include a state machine, an instruction based processor and the associated software, or another hardware element.

The device or module can include software, including firmware embedded at a device, or software or microcode capable of operating a relevant environment of the processing system. The device or module can also include a combination of the foregoing examples of hardware or software. Note that processing system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Also, the invention is not limited to physical devices or units implemented in non-programmable hardware but can also be applied in programmable devices or units able to perform the desired device operations by operating in accordance with suitable program code. Furthermore, the devices may be physically distributed over a number of apparatuses, while functionally operating as a single device. Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A processing system for partitioning and managing timers in a virtualized system, the processing system comprising:
    an instruction based data processor;
    a memory; and
    a data co-processor including timer control hardware, the timer control hardware having:
        a task interrupter;
        a plurality of registers including a command register, a configuration register, and a response register; and
        a timer manager controller having an operation parser, a timer manager instance (TMI) controller, and a timer controller;
    the operation parser comprising;
        an input coupled to the command register to receive commands written into the command register by the data processor; and
        an output to provide control information to the TMI controller;
    the operation parser configured to:
        determine whether a received command is a create-timer-manager-instance (CTMI) command, a create-timer command, a delete-timer command, or a delete-timer-manager-instance (DTMI) command; and
        when the received command is a CTMI command that identifies a number of timers supported by a particular TMI to be created, provide first control information to the TMI controller via its output to implement the CTMI command, the first control information comprising the number of timers; and
    the TMI controller comprising:
        an input coupled to the output of the operation parser to receive the first control information;
        a first output coupled to the memory via a memory interface to allocate a TMI in a first block of memory having a number of locations based on the number of timers indicated in the first control information; and
        a second output coupled to the response register to provide a CTMI response for the data processor, wherein, in response to allocating the TMI in the first block of memory, the CTMI response indicates that the CTMI command was executed by the timer manager instance controller.

2. The processing system of claim 1, wherein the TMI controller allocates the first block of memory in response to the TMI controller not being busy, otherwise the TMI controller provides a CTMI response that indicates the CTMI command was not executed by the TMI controller in response to the TMI controller being busy.

3. The processing system of claim 1, wherein:
    the operation parser further configured to, when the received command is the create-timer command that indicates a granularity and a duration for a particular timer to be created, provide second control information to the TMI controller via its output to implement the create-timer command, the second control information comprising the granularity and the duration;

the timer controller comprising:
an input coupled to the output of the operation parser to receive the second control information;
a first output coupled to the memory via the memory interface to store a timer expiration time of a timer based upon the granularity and the duration at the first block of memory; and
a second output coupled to the response register to provide a create-timer response for the data processor that indicates the create-timer command was executed by the timer controller.

4. The processing system of claim 3, the timer control hardware further comprising:
a task initiator coupled to the TMI controller and to the timer controller, the task initiator comprising:
an output to provide a task request; and
a task interrupt controller comprising:
an input coupled to the output of the task initiator to receive the task request; and
an output coupled to the data processor to provide an interrupt in response to receiving the task request, the interrupt being indicative of an event;
the timer controller further comprising a third output coupled to the input of the task interrupt controller to provide a first task request to the task interrupt controller that indicates that the event is that the timer has expired when the timer controller determines that the timer has expired based upon the expiration time;
wherein the task interrupt controller provides a first interrupt in response to the first task request, wherein the first interrupt indicates that the timer has expired.

5. The processing system of claim 4, wherein, when the received command is the delete-timer command that includes an identifier of a particular timer to be deleted by the delete-timer command:
the operation parser provides third control information to the TMI controller via its output to implement the delete-timer command, the third control information comprising the identifier;
the input of the timer controller is further to receive the third control information; and
the second output of the timer controller is further to provide a delete-timer response to the response register that indicates to the data processor that the delete-timer command was executed by the timer controller.

6. The processing system of claim 5, wherein, when the delete-timer command further includes an indication to force an expiration of the particular timer to be deleted by the delete-timer command:
the third control information further includes the indication;
the timer controller further forces the expiration of the timer prior to its stored expiration time, deletes the timer from the memory after forcing the timer to expire, provides a second task request to the task interrupt controller in response to the timer expiring, and provides a third task request to the task interrupt controller in response to deleting the timer; and
the task interrupt controller further provides a second interrupt in response to the second task requests and a third interrupt in response to the third task request,
wherein the second interrupt indicates that the timer has expired and the third interrupt indicates that the timer has been deleted.

7. The processing system of claim 5, wherein, when the delete-timer command further includes an indication to permit the particular timer to expire based on its stored expiration time prior to deleting the particular timer:
the third control information further includes the indication;
the timer controller further allows the timer to expire based on its stored expiration time, deleted the timer from the block of memory locations after the timer expires, provides a second task request to the task interrupt controller in response to the timer expiring, and provides a third task request to the task interrupt controller in response to deleting the timer; and
the task interrupt controller further provides interrupts in response to the second and third task requests, wherein the interrupts indicate that the timer has expired and the timer has been deleted.

8. The processing system of claim 3, wherein, when the received command is the DTMI command including an identifier of the particular TMI to be deleted by the DTMI command:
the operation parser provides third control information to the TMI controller via its output to implement the DTMI command, the third control information indicating the particular TMI; and
the TMI controller deletes the timer from the block of memory, deallocates the block of memory from the TMI, and provides the DTMI response to the response register that indicates that the DTMI command was executed by the TMI controller.

9. The processing system of claim 1, wherein the data processor comprises a dedicated portion that interfaces directly with the input of the operation parser.

10. A method for partitioning and managing timers in a virtualized system using a timer control hardware of a data-coprocessor, the timer control hardware having a command register, a response register, and a timer manager controller that includes an operation parser, a timer manager instance (TMI) controller, and a timer controller, the method comprising:
receiving a command from an instruction based processor at the command register of a data co-processor;
reading, by the operation parser of the timer manager controller, the received command from the command register;
determining, by the operation parser, whether the received command is a create-timer-manager-instance (CTMI) command, a create-timer command, a delete-timer command, or a delete-timer-manager-instance (DTMI) command;
in response to determining that the received command is a first CTMI command that identifies a first number of timers supported by a particular timer manager instance (TMI) to be created, allocating, by the TMI controller of the timer manager controller, a TMI in a first block of memory having a number of locations based on the first number of timers identified in the CTMI command; and
storing, by the TMI controller, a first CTMI response in the response register of the co-processor to be read by the instruction based processor, wherein the first CTMI response indicates that the first CTMI command was executed by the timer manager controller.

11. The method of claim 10, further comprising:
in response to determining that the received command is a second CTMI command received from the instruction based processor before the timer manager controller writes the first CTMI response, storing, by the TMI controller of the timer manager controller, a second CTMI response in the response register to be read by the instruction based processor, wherein the second CTMI response indicates that the second CTMI command was not executed by the timer manager controller.

12. The method of claim 10, further comprising:
in response to determining that the received command is a second CTMI command received from the instruction based processor, the second CTMI command including a second number of timers for a second timer instance, allocating, by the TMI controller of the timer manager controller, a second block of memory having a number of locations based on the second number of timers in response to receiving the second CTMI command, the second block of memory locations being different from the first block of memory locations; and
storing, by the TMI controller of the timer manager controller, a second CTMI response in the response register to be read by the instruction based processor, wherein the second CTMI response indicates that the second CTMI command was executed by the timer manager controller.

13. The method of claim 10, wherein the first CTMI response includes a timer manager instance identifier (TMI-ID) associated with the first block of memory, the method further comprising:
in response to determining that the received command is a first create-timer command received from the instruction based processor, the first create-timer command including the TMI-ID, a first granularity, and first duration for a first timer to be created by the first create-timer command, storing, by the TMI controller of the timer manager controller, a first timer at a first location of the first block of memory based upon the TMI-ID, wherein the first timer includes a first timer expiration time based upon the first granularity and the first duration; and
storing, by the TMI controller of the timer manager controller, a first create-timer response in the response register to be read by the instruction based processor, wherein the first create-timer response indicates that the first create-timer command was executed by the timer manager controller.

14. The method of claim 13, further comprising:
determining, by the operation parser of the timer manager controller, that the first timer has expired based upon the expiration time; and
providing, by a task interrupt controller, a first indication to the data processor that the first timer has expired.

15. The method of claim 14, further comprising:
in response to determining that the received command is a first delete-timer command received from the instruction based processor, the first delete-timer command including a first identifier of the first timer to be deleted by the first delete-timer command, storing, by the TMI controller of the timer manager controller, a first delete-timer response in the response register to be read by the instruction based processor, wherein the first delete-timer response indicates that the first delete-timer command was executed by the timer manager controller.

16. The method of claim 15, wherein the first delete-timer command further includes an indication to force an expiration of the first timer, the method further comprising:
forcing, by the timer manager controller, the expiration of the first timer;
deleting, by the timer manager controller, the first timer from the first block of memory locations; and
providing, by the task interrupt controller, a second indication that the first timer has been deleted.

17. A data co-processor, comprising:
timer control hardware having a task interrupter, a timer manager controller, and a set of registers, wherein the set of registers include:
a command register configured to store a command written by a data processor, the command being one of a plurality of commands, the plurality of commands including a create-timer-manager-instance (CTMI) command identifying a number of timers supported by a timer manager instance (TMI) to be created, a create-timer command, a delete-timer command, and a delete-timer-manager-instance (DTMI) command;
a response register configured to store a response based on the stored command, the response being one of a plurality of responses including a create-timer-instance response associated with the CTMI command; and
the timer manager controller having an operation parser and a TMI controller, configured to:
read, using the operation parser, the command from the command register;
determine, using the operation parser, whether the received command is the CTMI command;
when the received command is the CTMI command, allocate, using the TMI controller, a TMI in a block of memory having a number of locations based on the number of timers identified in the CTMI command; and
store a CTMI response associated with the CTMI command into the response register, wherein the CTMI response indicates that the CTMI command was executed by the timer manager controller.

18. The data co-processor of claim 17, wherein:
the create-timer command identifies a granularity and a duration for a particular timer to be created by the create-timer command;
the plurality of responses includes a delete-timer response associated with the create-timer command;
in executing the command, the timer manager controller further stores a timer in the TMI in the memory, the timer including a timer expiration time based upon the first granularity and the first duration when the command is the create-timer command; and
in storing the response, the timer manager controller further stores the create-timer response to the response register when the command is the create-timer command.

19. The data co-processor of claim 17, wherein:
the DTMI command identifies the particular TMI to be deleted by the DTMI command;
the plurality of responses includes a DTMI response associated with the DTMI command;
in executing the command, the TMI controller of timer manager controller further deallocates the TMI from the block of memory when the command is the DTMI command; and in storing the response, the TMI controller of the timer manager controller further stores the DTMI response to the response register when the command is the DTMI command.

* * * * *